US007412394B2

(12) United States Patent
Hsuan et al.

(10) Patent No.: US 7,412,394 B2
(45) Date of Patent: Aug. 12, 2008

(54) SYSTEM AND METHOD FOR FOUNDING ESTABLISHMENT THROUGH INTERNET

(75) Inventors: John Hsuan, Hsin-Chu (TW); Ellis Lee, Hsin-Chu (TW)

(73) Assignee: United Microelectronics Corp., Hsin-chu (TW)

( * ) Notice: Subject to any disclaimer, the term of this patent is extended or adjusted under 35 U.S.C. 154(b) by 923 days.

(21) Appl. No.: 09/769,091

(22) Filed: Jan. 24, 2001

(65) Prior Publication Data

US 2002/0099558 A1 Jul. 25, 2002

(51) Int. Cl.
*G06Q 10/00* (2006.01)
(52) U.S. Cl. ............................................. 705/1; 705/26
(58) Field of Classification Search ..................... 705/1, 705/26
See application file for complete search history.

(56) References Cited

U.S. PATENT DOCUMENTS

| 6,301,574 | B1 * | 10/2001 | Thomas et al. ................. 707/1 |
| 2001/0034692 | A1 * | 10/2001 | McRedmond ................. 705/37 |
| 2002/0046187 | A1 * | 4/2002 | Vargas et al. ................. 705/67 |
| 2002/0087446 | A1 * | 7/2002 | Reddy ........................ 705/36 |
| 2002/0087506 | A1 * | 7/2002 | Reddy ........................ 707/1 |

OTHER PUBLICATIONS

Information on Food Market Exchange, 2000-2001, printed through www.archive.org.*
U.S. Appl. No. 60/193,758, filed Mar. 31, 2000.*
Eisenhart U.S. Appl. No. 60/192,600, filed Mar. 27, 2000.*
New E-Commerce Model Launched at WebSwap; WebSwap's Garage Sale' Features Dynamic Pricing with Prices Going Down Every Hour, Sep. 14, 2000, Business Wire.*
MarketItRight.com Announces Partnership with Tech-Tours.com; Marketing Services Team to Provide Comprehensive Solutions for International Marketing, Dec. 4, 2000, Business Wire.*

* cited by examiner

*Primary Examiner*—Naresh Vig
(74) *Attorney, Agent, or Firm*—Merchant & Gould P.C.

(57) ABSTRACT

A system for speeding up an establishment's foundation through Internet comprises a data storage device having databases built therein and an electronic hub connected to the data storage device through computer program. The electronic hub is cooperated with the data storage device, whereby is capable to communicate, examine the resource provider, save the resource provider, and match the resource provider and whereby speeds up the establishment's foundation. A method for speeding up founding establishment through Internet comprises communicating, examining the resource provider, saving the resource provider, and matching the resource provider.

13 Claims, 7 Drawing Sheets

| item | class | scope | capital | office area | technology | employer | rules and regulation |
|---|---|---|---|---|---|---|---|
| status | service | middle | 100,000,000 | 200ft² | owner | 70 | compact |

FIG.2A

SYSTEM AND METHOD FOR FOUNDING ESTABLISHMENT THROUGH INTERNET

BACKGROUND OF THE INVENTION

1. Field of the Invention

The invention relates to a system and a method for founding establishment, and more particularly to a system and a method for speeding up founding establishment through Internet.

2. Description of the Prior Art

It is introduced that concept of electronic hubs (eHubs) in Business-to-Business (B2B) E-commerce. The eHubs is defined as neutral Internet-based intermediaries that focus on specific industry verticals or specific business processes, host electronic marketplaces, and used various market making mechanisms to mediate any-to-any transactions among businesses.

To understand B2B hubs, it is useful to understand how businesses buy, and what they buy. At the broadest level, business purchases can be classified into manufacturing inputs and operating inputs. Manufacturing inputs are raw materials and components that go directly into the manufactured product or manufacturing process. Manufacturing inputs tend to be vertical in nature, because the finished products that they go into are industry-specific. Operating inputs, on the other hand, are indirect materials and services that do not go into finished products. Operating inputs, sometimes call MRO (Maintenance, Repair, and Operating) inputs, include industrial supplies, capital equipment, services, and travel-related services. Unlike manufacturing inputs, operating inputs tend to horizontal nature (with the exception of capital equipment and some industrial supplies).

The other important distinction in business purchasing lies in how business buy products and services. Businesses can either engage in systematic sourcing or in spot sourcing. Systematic sourcing involves buying through pre-negotiated contracts with qualified suppliers. These contracts are often long-term in nature, so systematic sourcing tends to be relationship-oriented. Spot sourcing is transaction-oriented, and rarely involves a long-term or ongoing relationship between buyers and sellers.

Furthermore, there is one other dimension that is important in describing a B2B hub: its bias. B2B hubs can be either neutral or biased. Neutral hubs do not favor buyers over sellers or vice versa. Biased hubs, in contrast, favor either buyers or sellers. Neutral hubs by definition, they need to be careful in taking equal investments from large buyers as well as from large suppliers, because they can be perceived as biased. The benefit that neutral hubs have is that they are true "market-makers", because they bring both buyers and sellers together.

There is another category of hubs that are one-sided and biased by design. There biased hubs either work for sellers or buyers, and help them to negotiate better terms or streamline the buying/selling process. Biased hubs (like neutral hubs) can occur both as aggregations in systematic markets and as matchers in spot markets. When they favor sellers, biased hubs act as forward aggregators or most likely to succeed and add value in markets that are fragmented on both the buyer and seller sides.

Despite flourishing development of e-business, eHubs just passively provide connection services rather that meet requirements for those undefined buyers and sellers. For example, the business services provided by eHubs nowadays are rarely helpful to establishment founders. Depicted in FIG. 1, a company or factory consists of some fundamental resources, such as capital 110, factory building or land 120, technology groups 130, management group and human resource 140, and rules and regulations 150 in addition to administration idea or business plan 160 coordinated therein. In general, each cooperation among these fundamental resources is successfully implemented according to a series of advanced research, communication, negotiation, and making contrasts. Such model of the establishment-founded process is called a vertical model, whereby a company or factory can't be begun construction without some specific resources in advance, such as capital. There are doubtful effects on the reduction of search consumption for establishment foundation through B2B e-commerce. On the contrary, no in-time modification of suitable negotiation provided by the B2B e-commerce may result in the addition of cycle time, downcast establishment value and lower successful probability of establishment.

SUMMARY OF THE INVENTION

It is an object of the present invention to provide a system and a method for assisting foundation of a company or a factory. A business electronic hub system can provide various kinds of fundamental resources related to the company or the factory.

It is another object of the present invention to provide a system and a method for speeding up the foundation of the company or the factory. The business electronic hub system provides the certification and match services to the resource providers that would like to attend the foundation of a company or a factory, and thereby reduces cycle time of the foundation for the company or the factory.

In the present invention, A system for speeding up an establishment's foundation through Internet comprises a data storage device having databases built therein and an electronic hub connected to the data storage device through computer program. The electronic hub is cooperated with the data storage device, whereby is capable to communicate, examine the resource provider, save the resource provider, and match the resource provider and whereby speeds up the establishment's foundation. A method for speeding up founding establishment through Internet comprises communicating, examining the resource provider, saving the resource provider, and matching the resource provider.

BRIEF DESCRIPTION OF THE DRAWINGS

A better understanding of the invention may be derived by reading the following detailed description with reference to the accompanying drawing wherein:

FIG. 2A illustrates an example of a record in the business model database of one embodiment in accordance with the present invention;

DESCRIPTION OF THE PREFERRED EMBODIMENT

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Figure 1:
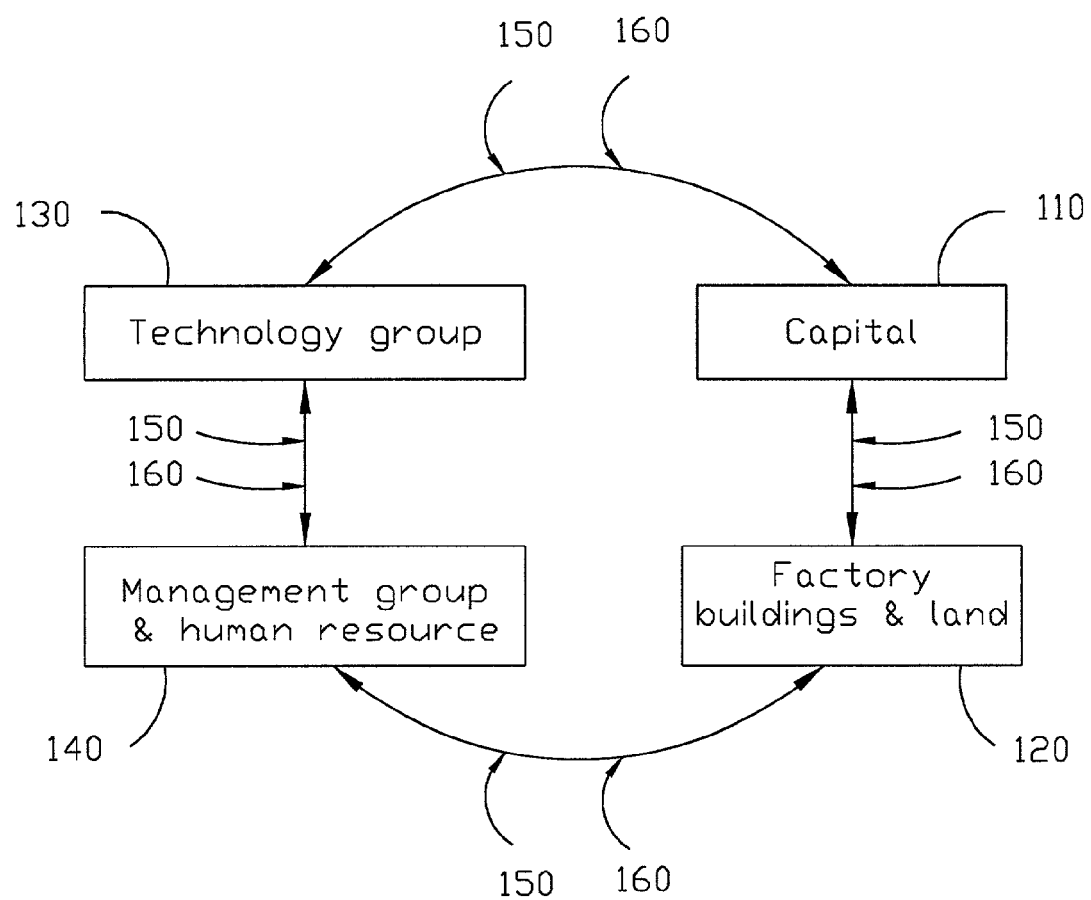
FIG. 1 is a schematic illustration of the fundamental factors for a company or a factory.
Figure 2:
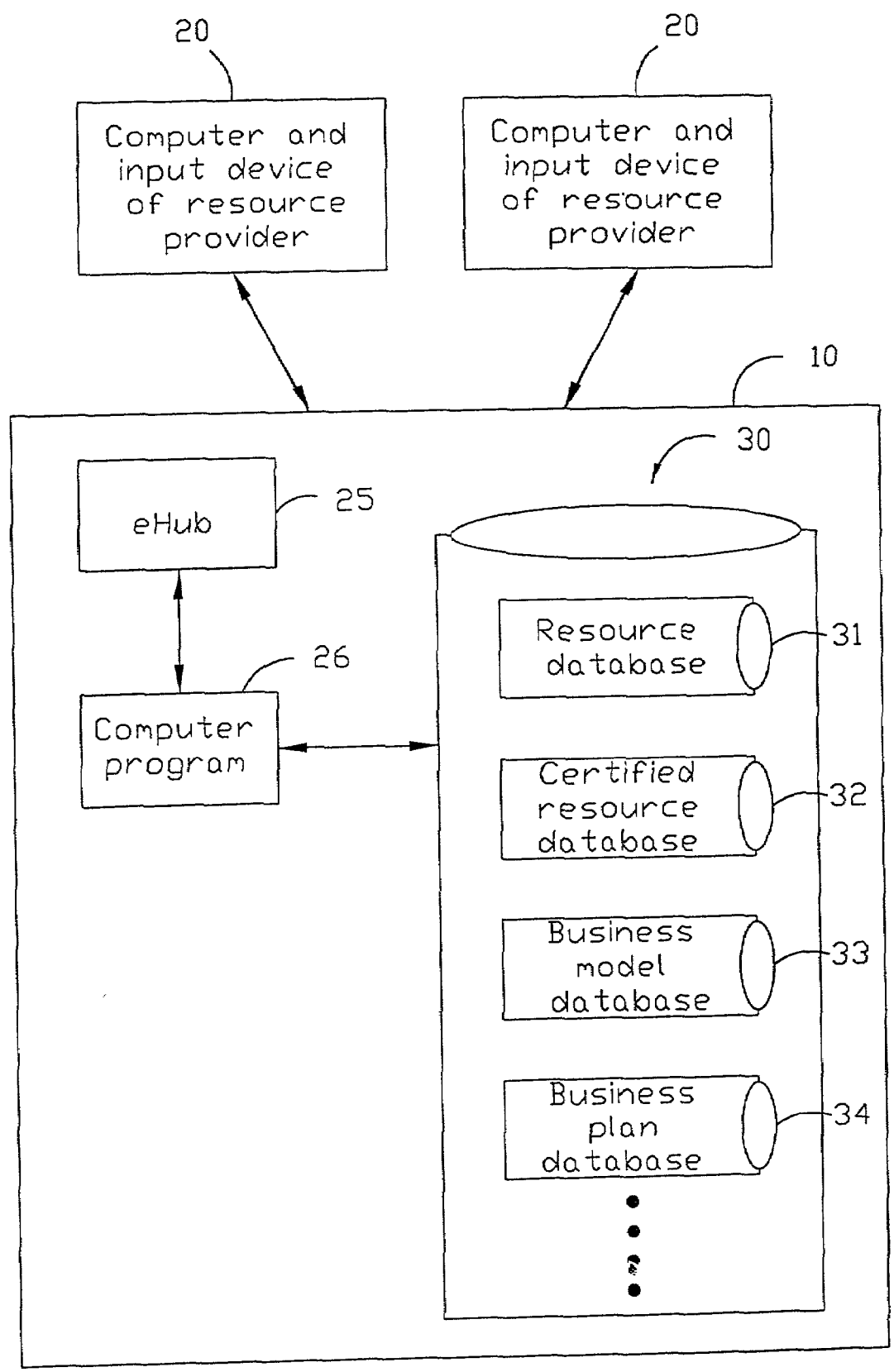
FIG. 2 is a schematic diagram illustrating system architecture in accordance with the present invention.

The system architecture of the present invention is illustrated with reference to FIG. 2. As shown in FIG. 2, the system of the present invention mainly comprises multitude of computers and input devices of the resource provider 20 and a business eHub system 10. Each computer and input device of the resource provider 20 is connected with the business e-Hub system 10 via an Internet connection using a public switched phone network, such as those provided by a local or regional telephone operating company. Such a connection may also be provided by dedicated data lines, cellular, personal communication systems, microwave, or satellite networks. On the other hand, a conventional personal computer or communication terminal may be used as the computer and input device of the resource provider 20. Furthermore, a conventional personal computer or computer workstation with sufficient memory and processing capability may be used as the business eHub system 10. In one embodiment, an eHub 25 operates as a web server. The business eHub system 10 must be capable of high volume transaction processing, performing a significant number of mathematical calculations in processing communications and database searches.

To be specific, the resources mentioned in the computer and input device of the resource provider 20 can be any necessary resources of the foundation of a company or a factory, such as capital, rental or renter of factory building or land, technology group, management group, rules and regulation, and administrative idea and business plan.

On the other hand, in the embodiment, the eHub 25 is the web server that comprises one or more conventional microprocessors (not shown) and conventional storage devices, such as one or more hard disk and therein multitude of software is installed. Furthermore, the business eHub system 10 comprises a data storage device 30 connected with the eHub 25 through computer program 26. Of course, the eHub 25 may include the data storage device 30. The data storage device 30 can be hard disk magnetic or optical storage units, as well as CD-ROM drivers or flash memory, and used in the processing of transactions in the present invention. In the embodiment, the data storage device 30 comprises resource database 31, certified resource database 32, business model database 33 and business plan database 34. To be specific, any database related to foundation of the company or factory may be also included in the data storage device 30. The multitude of databases in the data storage device 30 are illustrated with reference to the following paragraphs.

Furthermore, there are many records related to the resource providers or business models in each database. For example, there are many successful business models saved in the business model database 33. The business eHub system 10 can collect and analyze successful existed enterprises, and more actively, classify them various business models in the business model database 33. Thus, a matching function of the business eHub system may be implemented in accordance with the business models in the business model database 33.

Referring to FIG. 2A is an example of business model saved in the business model database 33. A record for a business model consists many items and corresponding status 18, such as class 11, scope 12, capital 13, office area 14, technology 15, employer 16, rules and regulation 17, and so on. According to analysis of the business eHub system 10, a suitable combination may be collected in a record shown as FIG. 2A.

Figure 3:
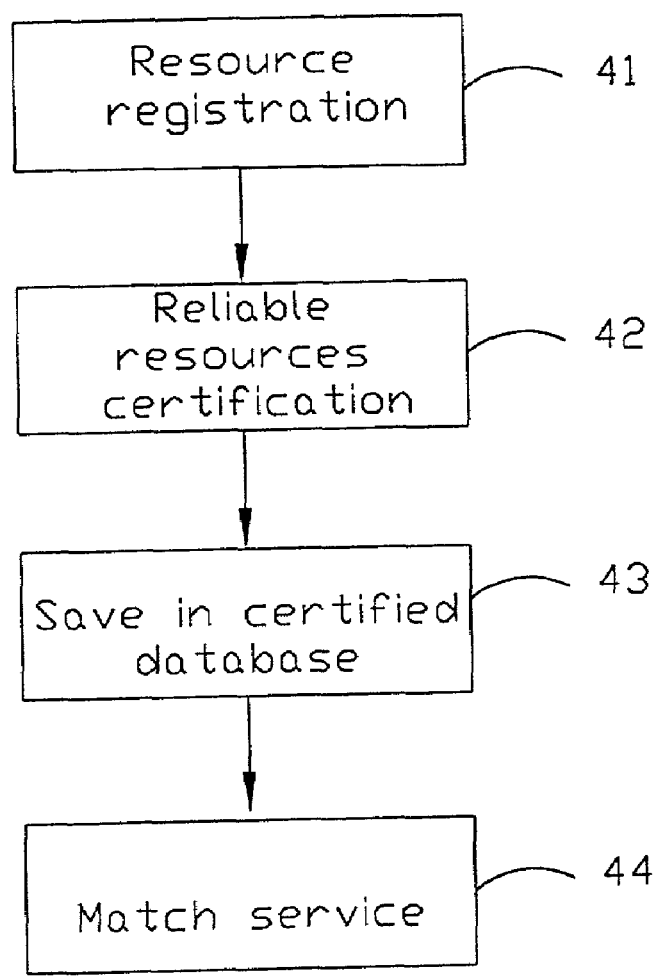
FIG. 3 is a block diagram illustrating a flow chart in accordance with the present invention.

Referring to FIG. 3 is an examination flow chart of the present invention. In the embodiment, the business eHub system 10 is defined as a neutral Inter-based intermediary and has ability of to communicate with exterior environment such as Internet. The business eHub system 10 not only provides passive connection to the web-sites of other related resources, but also actively builds certifications and examinations for the connected web-sites of the related resources. The purpose of building the certifications and examinations is for both reducing the cycle time of the foundation of the company or factory and raising successful probability of establishment foundation.

First, each resource provider, including capital provider, capital collector, rental or renter of factory building or land, technology group, management group, or provider of the administrative ideal and business plan, needs to connect to the eHub of the business eHub system for resource registration (step 41) and is classified according to its characteristics, such as scope or market value. The business eHub system may proceed a series of the written and substantial examinations for the registered resource provider. The items of examinations, for example, the capital provider's financial records with bank, the owner authority of the factory buildings or land, the members' education and background of the technology group, and so on, are for conforming the resource provider's reliabilities. The reliable resource provider can be certified and thereafter has priority rights on multitude of services provided by the business eHub system (step 42). Furthermore, the information of those certified resource providers can be recorded in the certified resource database of the business eHub system (step 43).

Furthermore, the business eHub system provides a match service for the certified resource providers (step 44). In accordance with the resource providers' information in the certified resource database, the business eHub system can reduce the match period for the resource providers. Different from those conventional eHubs in the electronic business, the business eHub system of the present invention regards the foundation of the company or the factory as a product and simultaneously plays the role of the brokerage, matching and screening on the foundation of the company or the factory during the electronic business. On the other hand, the business eHub system may help the certified resource providers make contrasts if they cooperate in accordance with the match provided by the business eHub system. Of course, for eternal administration, the business eHub system may charge some commission from the successful matching resource providers or share the technology stocks of the successful newborn company or factory.

Figure 3A:
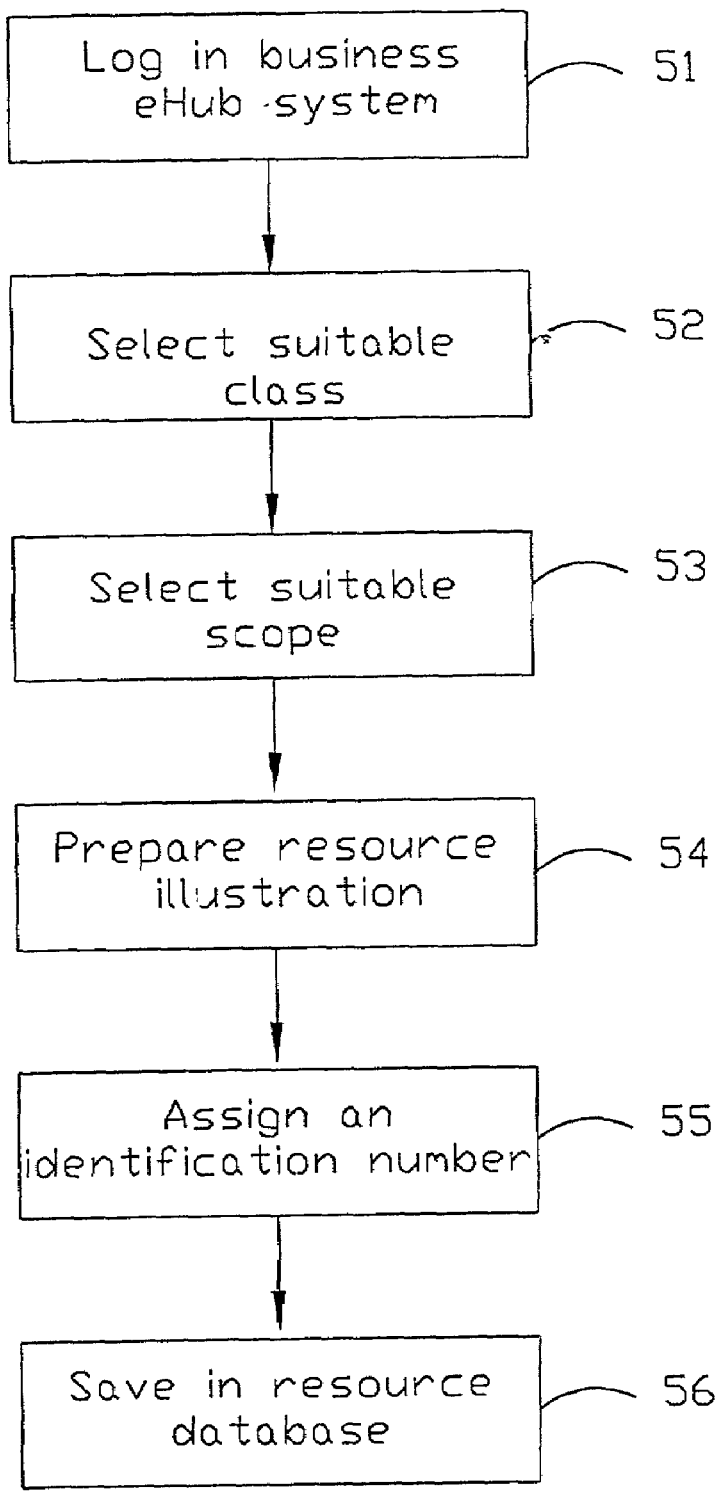
FIGS. 3A through 3C are block diagrams illustrating the steps in FIG. 3.

FIG. 3A illustrates the flow chart of the resource registration in the step 41 of FIG. 3. First, the resource provider logs in the web-site of the business eHub system (step 51). Next, the resource provider needs to select the suitable class (step 52), such as bank class, and the suitable scope (step 53), such as a small scope within 100 employers, according to the resource characteristics. On the other hand, the resource provider also needs to prepare the resource illustration by itself (step 54). Any resource provider can know about other resources recorded in the resource database in accordance with their resource illustrations. Thereafter, the business eHub system may assign the resource provider an identification number (step 55). Furthermore, the resource provider having its own identification number can be recorded and saved in the resource database (step 56).

Figure 3B:
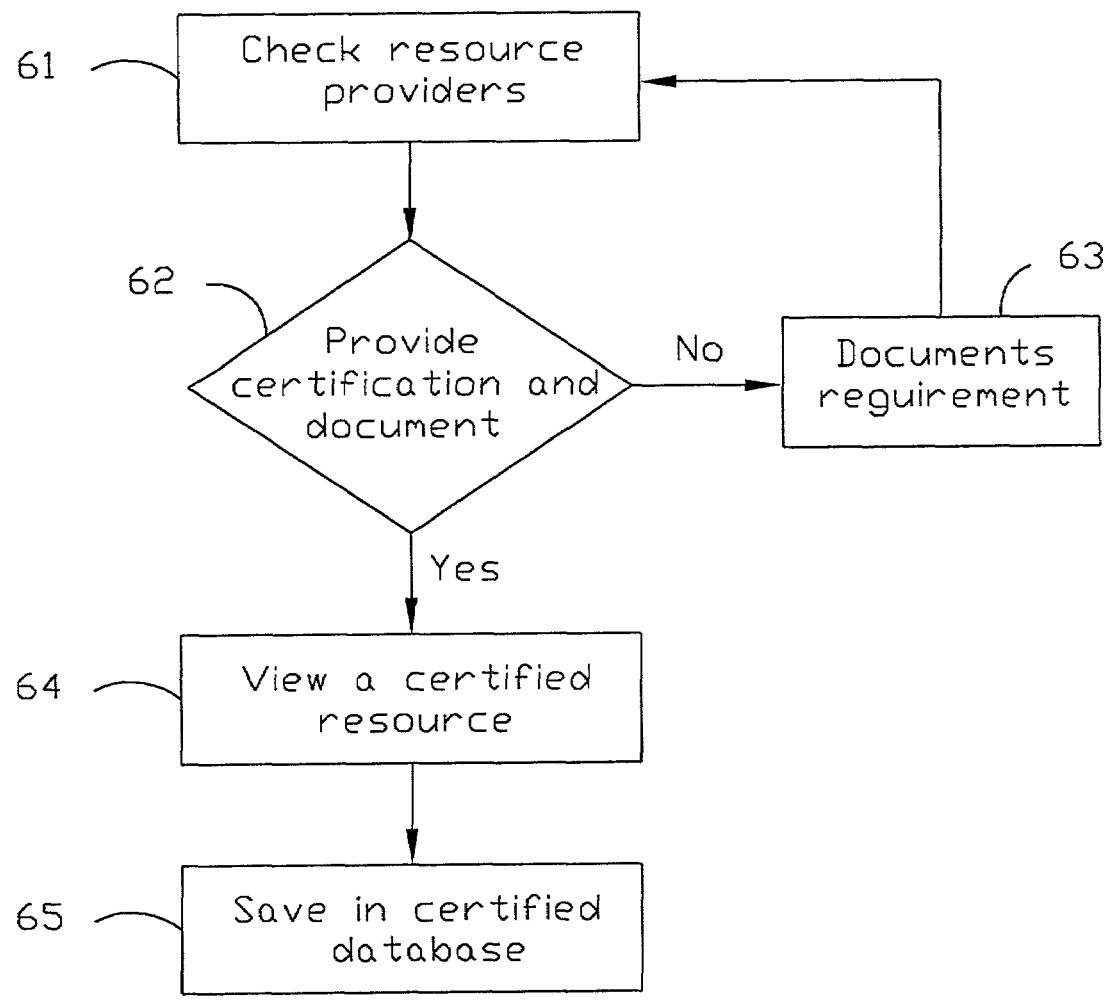

FIG. 3B is a flow chart illustrating the step 42 in FIG. 3. The business eHub system may periodically check the resource providers recorded in the resource database (step 61), wherein those resource providers only have identification number and aren't yet passed the examination of the business eHub system. When the resource provider provides any political certifications or documents (step 62) and examined by the business eHub system, it can be viewed as a certified resource (step 64) and its information can be saved in the certified resource database (step 65). Otherwise, the business eHub system may make documents requirements for the resource providers (step 63) to further conform the resource providers.

Figure 3C:
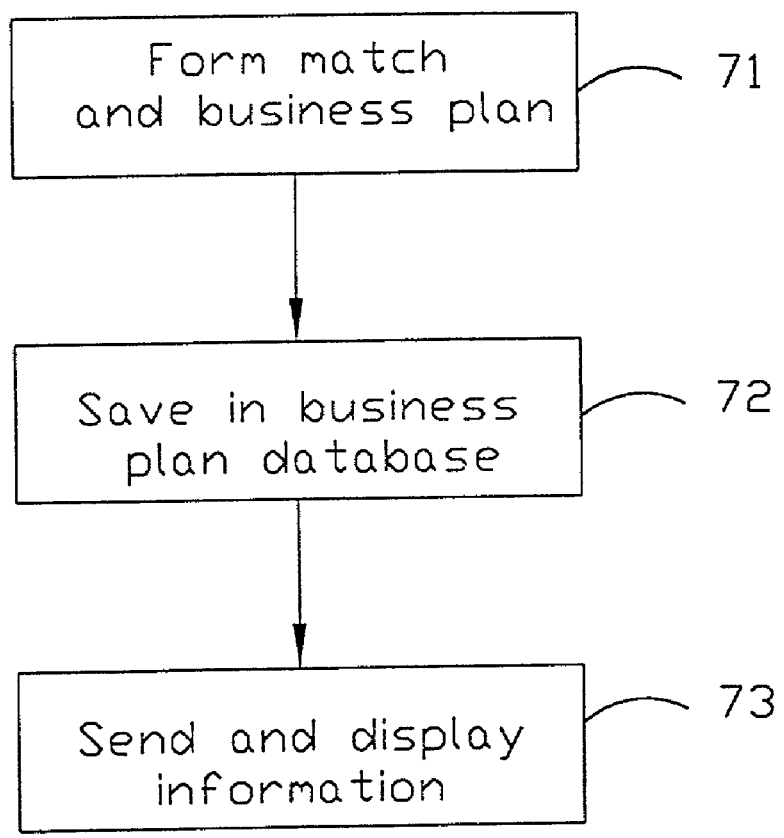

The step 44 of FIG. 3 is shown in FIG. 3C. The business eHub system may collect and analyze the certified resource providers in the certified resource database and further implement possible matches and business plans (step 71) for the certified resource providers. On the other hand, those possible business plans are defined their priorities according to similarities to the business models in the business model database. Furthermore, those possible business plans may be saved in the plan database (step 72). The business eHub system may send the messages to the resource providers related to the possible business plans and further display the possible business plans in the web-site of the eHub(step 73). The related resource providers can decide by themselves whether they take part in the business plans or not.

The business eHub system of the embodiment, with both passively connection with web-sites of the resource providers and actively stepping in negotiation, can provide a parallel process for searching cooperation partners. In such parallel process, the resource providers can simultaneously adjust their own plans for improvement and success according to the matches and business plans provided by the business eHub system. Furthermore, the resource providers belonging to any types or scopes also can be a start for the foundation of the company or factory and parallel search cooperation partners. For example, through the matches and business plans, the owners of the technology group can adjust the technology direction for reducing consumption of the coming cooperation schedule according to suitable capital, office area, and the business plans.

It is one object of the business eHub system of the present invention to have simultaneously functions of brokerage, matcher and screening. The purpose of the present invention is for driving the foundation of the company or factory, so that a company or factory can be viewed as merchandise of the present invention. The business eHub system executing examination, negotiation and match processes, is similar to stepping in the manufacture process of the merchandise, which can help raising the value of the establishment foundation, success probability and reducing the consumption of the cycle time.

In the present invention, a system for speeding up an establishment's foundation through Internet comprises a data storage device having at least a resource database, a certified database, a business model database, and a plan database and an electronic hub connected to the data storage device through computer program. The electronic hub is cooperated with the data storage device, whereby is capable to register, save a resource provider, examine the items of the resource provider, save a record of the resource provider, and match the resource provider in the certified resource database and whereby speeds up said establishment's foundation. A method for reducing cycle time of founding establishment with electronic commerce comprises registering in the electronic hub system, saving a resource provider, examining the items of the resource provider, saving a record of the resource provider, and matching the resource provider in the certified resource database according to the record of the resource provider.

What is claimed is:

1. A method for efficiently matching resources required to establish business and business facilities through the Internet, said method comprising:

providing an electronic hub system configured to communicate with at least one resource provider, wherein said electronic hub system comprises a data storage device including a plurality of databases built therein;

communicatively coupling said resource provider with said electronic hub system and providing a plurality of items of said resource provider to said electronic hub system by said resource provider for examining, and then forming a business model from said a plurality of items;

saving a record of said items of said resource provider in one of said plurality of databases;

examining said plurality of items of said resource provider by said electronic hub system thereby certifying said resource provider as being able to provide at least one selected from the group consisting of capital, land, building rental, management group, rules and regulations, administrative ideas, and business plan and to confirm said resource provider's reliabilities;

storing a record of said certified resource provider along with the data regarding the certify items in another one of said plurality of databases;

matching said resource provider according to said record of said resource provider with other certified resource providers having a record saved in said electronic hub system, comprising:

collecting and analyzing the stored records of stored certified resource providers in said electronic hub system for implementing matches with said record of said certified resource provider; and implementing matches and forming business plans for a requesting certified resource provider and matched certified resource provider stored in said electronic hub system based on similarities to business models of the certified resource providers to enable efficient obtainment of resources necessary for establishing a company or a factory, wherein said business plans are created or selected from said electronic hub system based on request of said certified resource providers; and sending and displaying said business plans to said certified resource providers for deciding whether said certified resource providers take in part in the said business plans, and if said certified resource providers cooperate in accordance with the match provide by said electronic hub system, and then said electronic hub system help the said certified resource providers communicate each other or make contrasts.

2. The method according to claim 1 further comprising establishing an electronic contract for said resource provider.

3. The method according to claim 1, wherein said electronic hub system comprises an electronic hub.

4. The method according to claim 1, wherein said databases comprise:

a resource database and said record of said resource provider stored therein;

a certified resource database having said record of said certified resource provider certified with said items;

a business model database having a plurality of business models of enterprises; and a plan database having at least a business plan combining said record of said resource provider with said business models of enterprises.

5. The method according to claim 4, wherein said matching step further comprises a step of
defining a priority of said business plans according to similarities to said business models of said certified resource providers;
saving said business plans in said electronic hub system;
sending said business plans to said resource providers certified; and
displaying said business plans.

6. The method according to claim 1, wherein said resource provider comprises a capital provider.

7. The method according to claim 1, wherein said items comprises an official document related to said resource provider.

8. The method according to claim 1, wherein said communicating step comprises:
logging in said electronic hub system;
selecting a class for said resource provider;
selecting a scope for said resource provider;
assigning an identification number to said resource provider; and
saving said record of said resource provider in said electronic hub system.

9. A system for efficiently establishing companies and factories through a world-wide Internet, said system comprising:
a data storage device having a plurality of databases built therein for storage records related to resource providers or business models; and
an electronic hub electronically connected to said data storage device for examining and matching said resource provider, said electronic hub configured to cooperate with said data storage device to:
communicate with a resource provider and providing a plurality of items of said resource provider to said system by said resource provider for examining, wherein said a plurality of items forming a business model;
examine said a plurality of items of said resource provider by said electronic hub system thereby certifying said resource provider as being able to provide at least one selected from the group consisting of capital, land, building rental, management groups, regulation, administrative ideas, and business plans and to confirm said resource provider's reliabilities;
save a record of said certified resource provider along with the data regarding the certify items in said data storage device;
match said resource provider according to said record of said resource provider with other certified resource providers having a record saved in said data storage device, comprising:
collect and analyze the stored records of stored certified resource providers in said electronic hub system for implementing matches with said record of said certified resource provider;
implement matches and forming business plans for said certified resource providers according to similarities to business models of said certified resource providers, wherein said business plans are created or select from said electronic hub system base on request of said certified resource providers; and
send and display said business plans to said certified resource providers for deciding whether said certified resource providers take in part in the said business plans.

10. The system of claim 9, wherein said electronic hub is further configured to establish an electronic contract of said resource provider.

11. The system of claim 9, wherein said plurality of databases comprise:
a resource database for registering said resource provider;
a certified resource database having said record of said certified resource provider with said items;
a business model database having a plurality of business models of enterprises; and
a plan database having at least a business plan combined said record of said resource provider with said business models of enterprises.

12. The system of claim 11, wherein said electronic hub is further configured to:
define a priority of said business plan according to similarities to said business models of said certified resource providers;
saving said business plans in said plan database;
sending said business plans to said certified resource providers; and
displaying said business plans.

13. The system of claim 11, wherein said electronic hub is further configured to:
log in said electronic hub for said resource provider;
select a class for said resource provider;
select a scope for said resource provider;
assign an identification number to said resource provider; and
save said record of said resource provider in said resource database.

* * * * *